United States Patent [19]
Smith et al.

[11] Patent Number: 5,914,846
[45] Date of Patent: Jun. 22, 1999

[54] CABLE INTERCONNECTION APPARATUS FOR NETWORK INTERFACE DEVICE

[75] Inventors: Thomas J. Smith, West Bayshore; Peter A. Arcati, Babylon, both of N.Y.

[73] Assignee: TII Industries, Inc., Copiague, N.Y.

[21] Appl. No.: 08/851,886

[22] Filed: May 6, 1997

[51] Int. Cl.$^6$ ..................................................... H02H 1/00
[52] U.S. Cl. ........................ 361/119; 361/120; 361/127
[58] Field of Search ................................. 361/119, 117, 361/120, 124, 127, 58, 56; 439/638; 379/399

[56] References Cited

U.S. PATENT DOCUMENTS

| | | | |
|---|---|---|---|
| 4,785,381 | 11/1988 | Collins | 361/417 |
| 4,979,209 | 12/1990 | Collins et al. | 379/399 |
| 5,394,486 | 2/1995 | Schneider et al. | 379/399 |
| 5,553,136 | 9/1996 | Meyerhoeffer et al. | 379/399 |
| 5,566,056 | 10/1996 | Chaudhry | 361/117 |

*Primary Examiner*—Jeffrey Gaffin
*Assistant Examiner*—Stephen Jackson
*Attorney, Agent, or Firm*—Morgan & Finnegan

[57] ABSTRACT

Cable interconnection apparatus for connecting coaxial cable and fiber optic cable, the cable interconnection apparatus being adapted to be removably mounted in network interface devices containing subscriber bridge modules.

19 Claims, 5 Drawing Sheets

CABLE INTERCONNECTION APPARATUS FOR NETWORK INTERFACE DEVICE

BACKGROUND OF THE INVENTION

1. Field of the Invention

The present invention relates to apparatus for interconnecting cables in network interface devices and, more particularly, to cable interconnection apparatus which can be removably mounted in network interface devices and which can interconnect coaxial cables and fiber optic cables.

2. Discussion of the Related Art

Network interface devices which interconnect telephone company ("telco") and subscriber lines are known in the art. Those network interface devices also provide overvoltage protection for the telco lines. One example of such a known network interface device is shown in U.S. Pat. No. 4,979,209 issued to Collins et al. on Dec. 18, 1990 and assigned to Keptel, Inc. (hereafter "the Keptel '209 patent"). FIG. 3 of the Keptel '209 patent shows overvoltage protection devices 73, while FIG. 2 shows removable subscriber line modules 91 through 96. Subscriber line modules are also known in the art as subscriber bridge modules.

It is also known in the art to employ network interface devices which not only interconnect telco and subscriber lines but also interconnect coaxial cables and fiber optic cables. An example of such a network interface device is shown in U.S. Pat. No. 5,553,136 issued to Meyerhoefer et al on Sept. 3, 1996 and assigned to TII Industries, Inc. (hereafter "the TII '136 patent"). A "bulkhead-type" interconnection 19 for coaxial cable or fiber optic cable is shown in FIG. 4 and described at column 6, lines 51–54 of the TII '136 patent. See also FIGS. 38 and 39. Such a bulk-head type interconnection is adapted to be permanently mounted in the network interface device and is not readily removable. In contrast, the subscriber bridge modules used to interconnect the telco and subscriber lines are readily removable. See, for example, removably mounted subscriber bridge modules 20 in FIGS. 2 and 4–13 of the TII '136 patent.

It is also known to provide a removable module for interconnecting coaxial cables in a network interface device which contains removable subscriber bridge modules. An example of such a removable interconnection module for coaxial cables is shown in U.S. Pat. No. 5,394,466 to Schneider et al issued Feb. 28, 1995 and assigned to Keptel, Inc. (hereafter "the Keptel '466 patent"). See cable television module 220 in FIGS. 1 and 5 of the Keptel '466 patent. As shown in FIGS. 2 and 3 of the Keptel '466 patent, cable television module 220 is not very practical because its complex construction would make it difficult and expensive to manufacture. Moreover, that cable television module does not readily lend itself to providing overvoltage protection for the coaxial cables.

Therefore, it is an object of the present invention to provide a cable interconnection apparatus for coaxial cables and fiber optic cables which is simple and inexpensive to manufacture and which can be easily installed in and removed from a network interface device.

It is another object of the invention to provide a coaxial cable interconnection apparatus which can be easily installed in and removed from a network interface device and which provides overvoltage protection for the coaxial cables.

It is a further object of the invention to provide a cable interconnection apparatus for coaxial cables and fiber optic cables which can be easily mounted in and removed from network interface devices which also contain removable subscriber bridge modules.

It is a further object of the invention to provide a network interface device with both removable subscriber bridge modules and removable cable interconnection apparatus for coaxial cables and fiber optic cables, the interconnection apparatus being simple and inexpensive to manufacture and being easily installed in and removed from the network interface device.

It is a further object of the invention to provide a network interface device with both removable subscriber bridge modules and removable coaxial cable interface apparatus, the interconnection apparatus being easily installed in and removed from the network interface device and providing overvoltage protection for the coaxial cables.

SUMMARY OF THE INVENTION

A cable interconnection apparatus according to the present invention preferably comprises a metallic structure having a generally horizontal base portion, a generally vertical middle portion and a generally horizontal top portion. The middle portion has an aperture in which can be mounted a coaxial connector with a coaxial surge arrestor, a bulkhead-type coaxial connector or a fiber optic cable connector. The cable interconnection apparatus of the present invention is simple and inexpensive to manufacture and is adapted to be easily mounted in and removed from network interface devices which also contain removably mounted subscriber bridge modules.

The network interface device according to the present invention comprises at least one removable cable interconnection apparatus according to the present invention and at least one removable subscriber bridge module, the subscriber bridge module preferably having a switchable electrical socket to provide a point of demarcation between the telco and subscriber lines.

The subject matter which we regard as our invention is more particularly pointed out in the claims at the end of the specification. The invention, including its method of operation and its numerous advantages, may best be understood by reference to the following description taken in connection with the accompanying drawings wherein like reference numerals refer to like components.

BRIEF DESCRIPTION OF THE DRAWINGS

In order that the invention may be more fully understood, it will now be described, by way of non-limiting examples, with reference to the accompanying drawings in which.

DESCRIPTION OF THE PREFERRED EMBODIMENT

Figure 1:
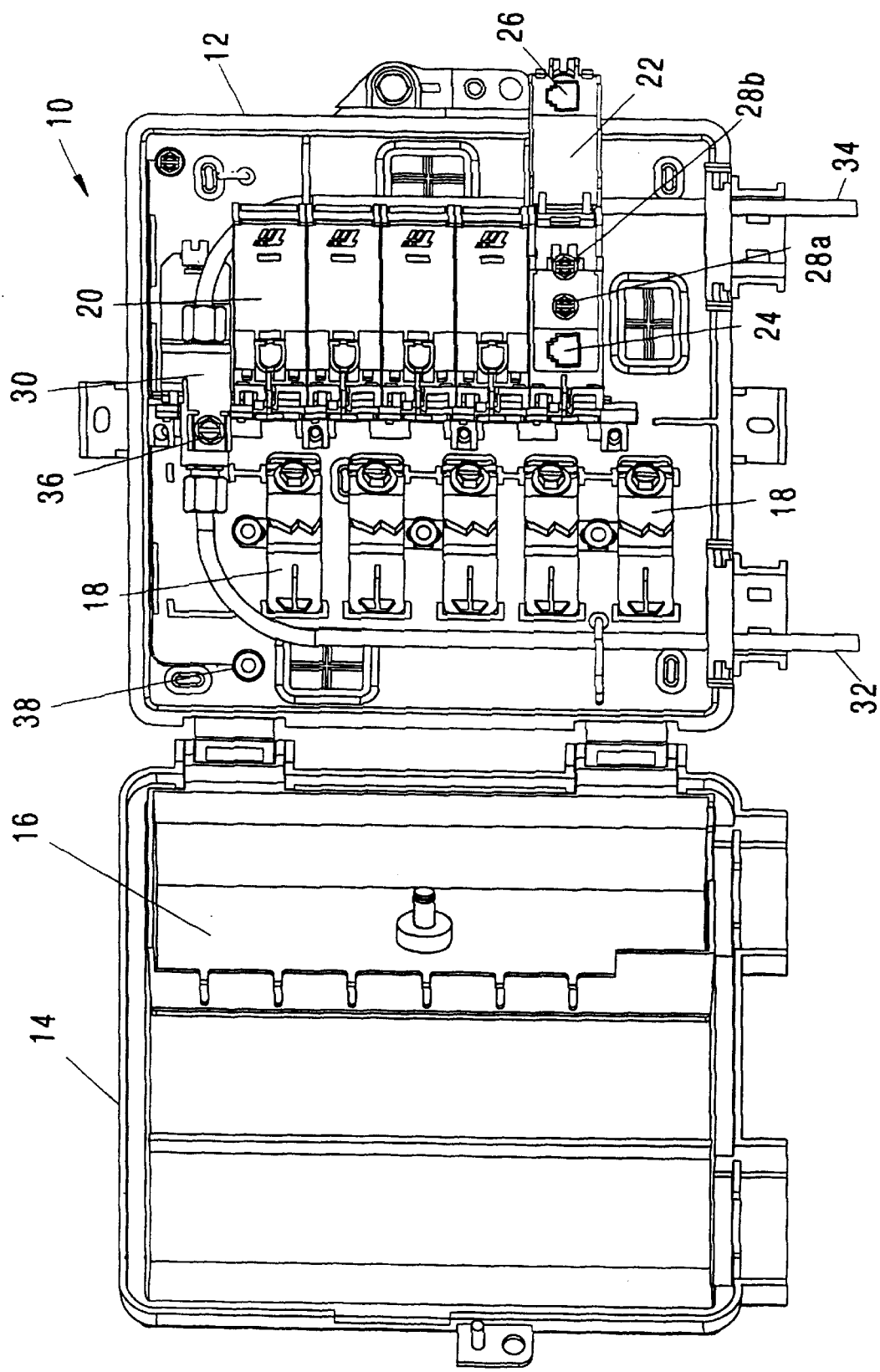
FIG. 1 is a top view of a network interface device employing the cable interconnection apparatus of the present invention.

FIG. 1 shows a network interface device 10 comprising an enclosure having a base 12, an outer cover 14 and an inner cover 16. The inner cover 16 covers the left hand side of the enclosure which contains a series of overvoltage protection devices 18 which protect telephone company lines from overvoltage conditions. Suitable overvoltage devices are Model No. MSP 350 sealed station protectors made by TII Industries, Inc., Copiague, N.Y. Inner cover 16 ensures that the left hand side of the enclosure is only accessible to telephone company personnel. The right hand side of the enclosure contains a series of removably mounted subscriber bridge modules 20 which connect the telco and subscriber lines. The subscriber bridge modules have hinged covers 22 which, when opened, reveal a telephone jack 24, which is preferably an RJ-11 type jack. Cover 22 contains a protective material 26 which environmentally protects jack 24 when the cover is closed. The subscriber modules have terminals 28a, 28b for connecting the subscriber telephone wires. The network interface device also includes a removable coaxial cable interconnection apparatus 30 which connects coaxial cables 32 and 34. Apparatus 30 is preferably made of metal and has an electrical connection 36 for connecting apparatus 30 to a ground terminal 38 by a wire (not shown). Terminal 38 is adapted to be connected to an earth ground (not shown) which is brought into the enclosure at the time of installation.

Figure 2:
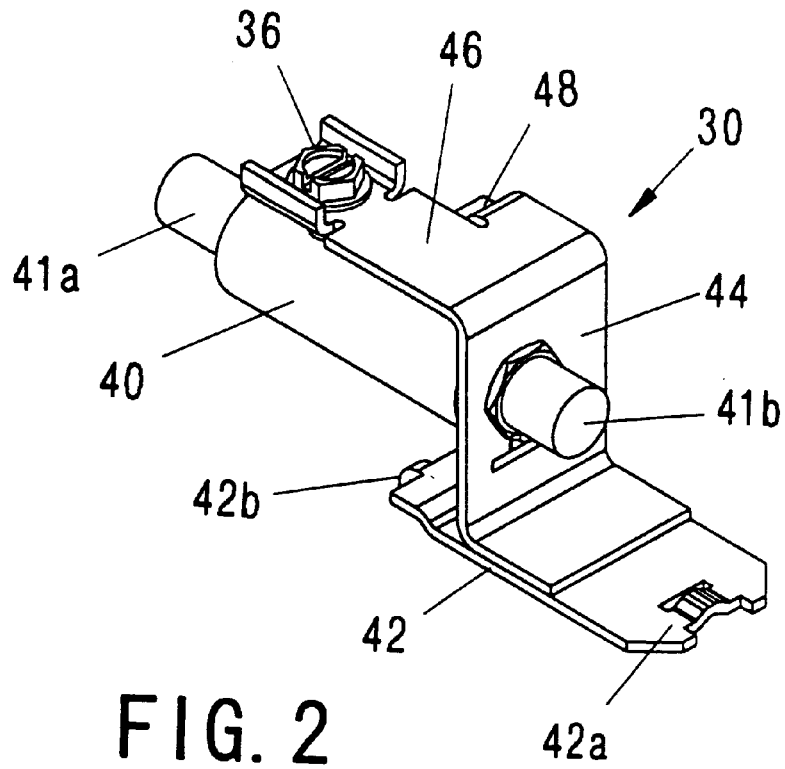
FIG. 2 is a perspective view of a coaxial cable interconnection apparatus of the present invention.

FIG. 2 shows a coaxial cable interconnection apparatus 30 having a coaxial surge arrestor 40 with a female F-type coaxial connector on each end. The coaxial surge arrestor may, for example, be a Model No. E2199 made by TII Industries, Inc., Copiague, N.Y. As shown in FIG. 2, apparatus 30 has a generally horizontal base portion 42, a generally vertical middle portion 44 and a generally horizontal top portion 46 having an electrical connection 36. The middle portion 44 has an aperture in which coaxial surge arrestor 40 is mounted. In the preferred embodiment the interconnection apparatus is formed from two pieces of metal (a first generally flat member and a second Z-shaped member) which are spot welded together to form the structure shown in FIG. 2. This results in a structure that is simple, strong and inexpensive to manufacture.

Figure 5:
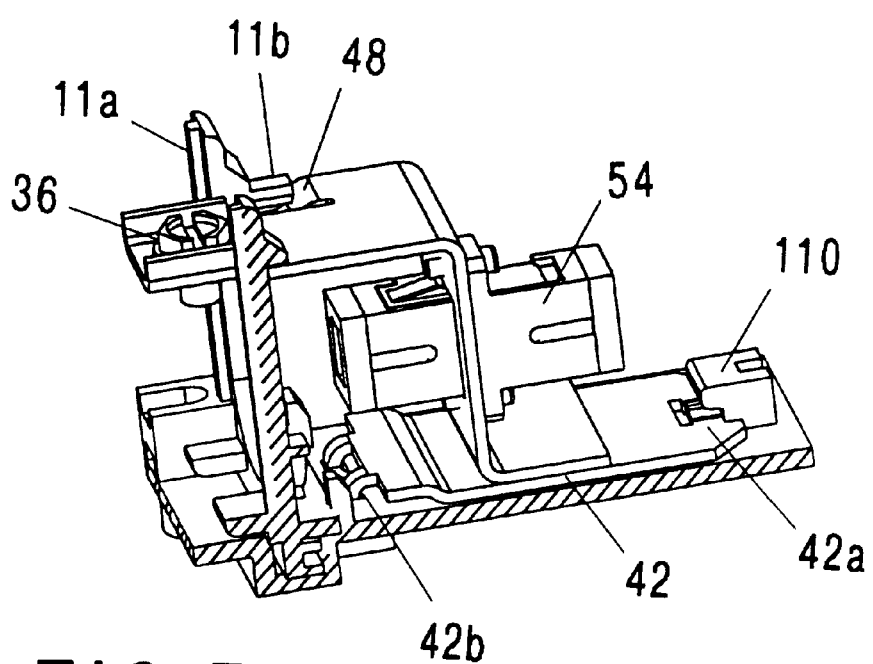
FIG. 5 is a view, partially in section, showing how a fiber optic cable interconnection apparatus of the present invention is mounted in a network interface device.

The cable interconnection apparatus of the present invention is adapted to be mounted interchangeably with subscriber bridge module 91 in FIG. 5 of the Keptel '466 patent. As noted at column 6, lines 61 et seq. of the Keptel '466 patent, module 91 is also described in FIGS. 13–17 of the Keptel '209 patent. As shown in FIGS. 13 and 14 of the Keptel '209 patent, the base of module 91 has a laterally projecting portion 114 at one end and a pair of downwardly projecting portions 115 at the other end. As shown in FIGS. 10 and 17, laterally projecting portion 114 fits under upwardly extending inverted L-shaped member 110 in the base of the enclosure, while downwardly projecting portions 115 fit into recess 112 in the base of the enclosure. See also column 6, line 44 through column 7, line 9 of the Keptel '209 patent which describes how module 91 is inserted in and removed from the enclosure.

As shown in FIGS. 1–5 of the Keptel '466 patent, cable television module 220 has a laterally projecting portion 248 at the base which extends under upwardly extending inverted L-shaped members 110 in the base of the enclosure. (See FIGS. 1 and 4 and column 6, lines 34–43 of the Keptel '466 patent and FIG. 10 of the Keptel '209 patent.) In addition, cable television module 220 has a notch 264 (See FIG. 2 of the Keptel '466 patent) which receives a tab 11b which projects laterally from flexible member 11a which extends upwardly from the base of the enclosure (See FIGS. 1 and 5 and column 6, lines 34–50 of the Keptel '466 patent).

The cable interconnection apparatus of the present invention is adapted to be removably mounted in a network interface device using the following three structural features: (1) a laterally projecting portion at one end of the base of the apparatus which is adapted to fit under an upwardly projecting inverted L-shaped member in the base of the enclosure; (2) a downwardly projecting portion at the other end of the base of the apparatus which is adapted to fit into a recess in the base of the enclosure; and (3) a notch located on or near the top portion of the apparatus which is adapted to receive a tab which projects laterally from a flexible member which extends up from the base of the enclosure. These three structural features define an apparatus having a "Keptel footprint."

Figure 3:
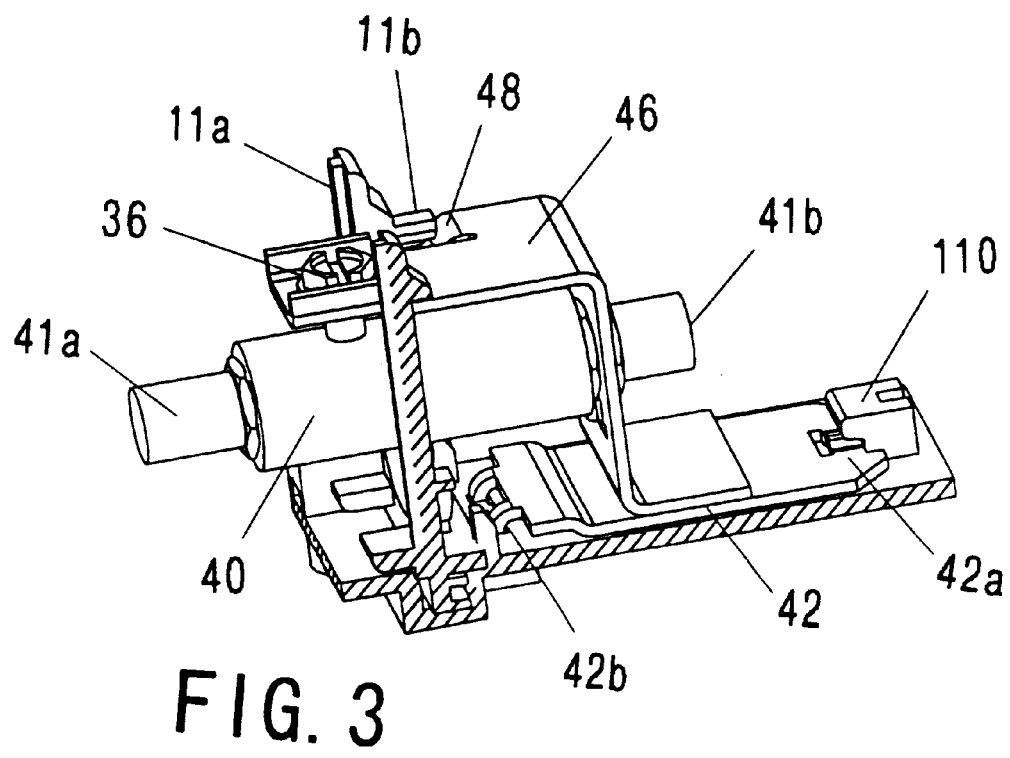
FIG. 3 is a view, partially in section, showing how the coaxial cable interconnection apparatus of FIG. 2 is mounted in a network interface device.

FIG. 3 illustrates how the coaxial cable interconnection apparatus of the present invention is removably mounted in a network interface device. A laterally projecting portion 42a at one end of the base 42 slides under the inverted L-shaped member 110 which projects up from the base of the enclosure. As shown in FIG. 2, the end of portion 42a preferably has a shallow cutout which fits around L-shaped member 110 and helps restrain lateral movement of base 42 relative to member 110. As shown in FIG. 3, the other end of base 42 has a downwardly projecting portion 42b which fits into a recess in the base of the enclosure. The top portion 46 has a slot 48 which is adapted to receive tab 11b which extends laterally from flexible member 11a which projects upwardly from the base of the enclosure. Thus, the coaxial cable interconnection apparatus shown in FIGS. 2 and 3 has a "Keptel footprint".

Figure 4:
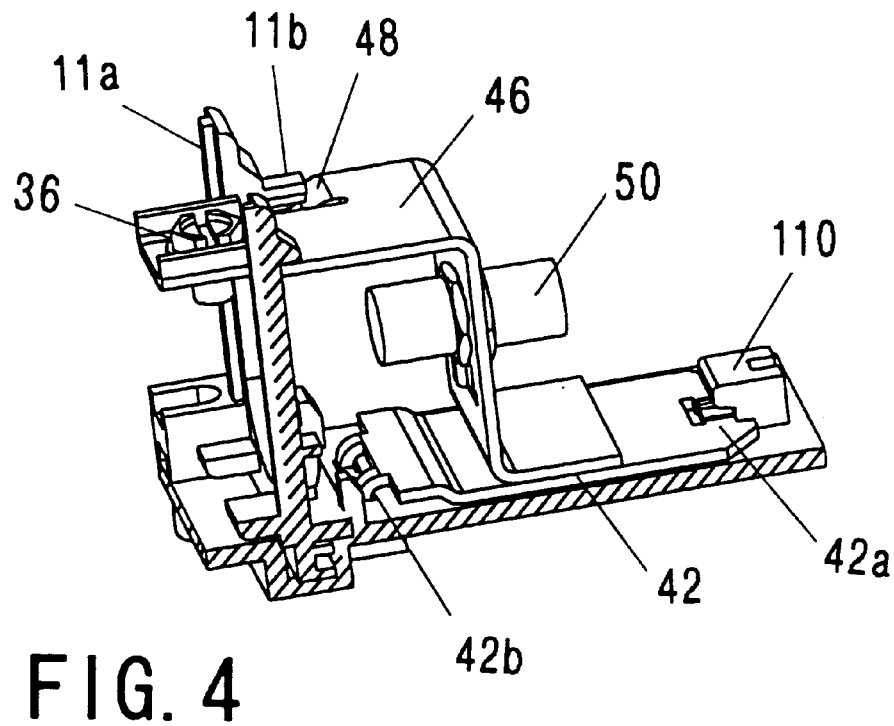
FIG. 4 is a view, partially in section, showing how an alternative embodiment of the coaxial cable interconnection apparatus of the present invention is mounted in a network interface device.

FIG. 4 illustrates another coaxial cable interconnection apparatus which does not have a coaxial surge arrestor but, instead, has a bulkhead-type coaxial connector 50. As shown in FIG. 4, connector 50 is a standard F-type connector having two female ends. The coaxial cable interconnection apparatus of FIG. 4 also has a "Keptel footprint" and is removably mounted in the network interface device the same way as the apparatus of FIG. 3.

FIG. 5 illustrates a fiber optic cable interconnection apparatus according to the present invention. In FIG. 5 connector 50 is a standard SC-type fiber optic cable connector. Fiber optic cables are covered by a metallic sheath which can be connected to electrical connector 36 which in turn can be connected to ground terminal 38 by a wire (not shown). The fiber optic cable interconnection apparatus of FIG. 5 also has a "Keptel footprint" and is removably mounted in the network interface device the same way as the apparatus shown in FIG. 3.

Figure 6:
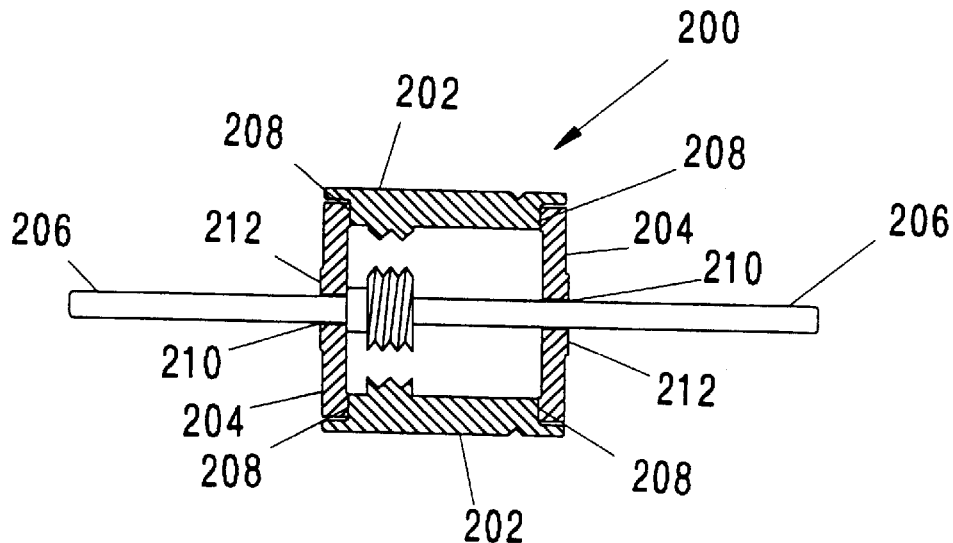
FIG. 6 is a cross-sectional view of a coaxial surge arrestor for use with the coaxial cable interconnection apparatus of the present invention.

FIG. 6 is a reproduction of FIG. 14 from U.S. Pat. No. 5,566,056 issued to Nisar A. Chaudhry on Oct. 15, 1996 and assigned to TII Industries, Inc. (hereafter "the TII '056 patent"). FIG. 6 illustrates a coaxial surge arrestor which may be used in the coaxial cable interconnection apparatus of FIG. 3. As explained at column 6, line 54 through column 7, line 51 of the TII '056 patent, a portion of the interior surface 214 of conductive housing 202 and a portion of the exterior surface 216 of center conductor 206 are roughened, for example by threads or other forms of serration, to concentrate the electric field and increase the reliability of the gas discharge tube operation. In addition, as with conventional gas discharge tubes, the surfaces 214 and 216 are preferably coated with a low work function material to reduce the breakdown voltage and enhance the firing characteristics of the gas discharge tube. The gas discharge occurs in the region "G" between surfaces 214 and 216. Region "G" is the active discharge region.

As also shown in FIG. 6, the distance between the inner surface of the conductive housing 202 and the outer surface of the center conductor 206 varies along the length of the center conductor. Put another way, the ratio of the inside diameter D of housing 202 to the outside diameter d of center conductor 206 varies along the length of the center conductor. The ratio D/d may vary by a factor of 2 or 3 or more along the length of center conductor 206. This variation in the ratio D/d is used to adjust the impedance of the gas discharge tube and for matching the impedance of the surge arrestor in which the gas discharge tube is located to that of the coaxial transmission line to which the surge arrestor is attached.

The impedance of a coaxial transmission line is proportional to the logarithm of (D/K)/d, where "D" is the inside diameter of the outer conductor, "d" is the outside diameter of the inner conductor and "K" is the dielectric constant of the medium between the inner and outer conductors. In the case of the gas discharge tube shown in FIG. 6, the medium is an inert gas which has a dielectric constant of approximately one. Therefore, the impedance of the gas discharge tube varies between the insulating ends as the logarithm of the ratio D/d. As noted earlier, the insulating ends 204 are preferably ceramic and ceramic has a dielectric constant of about eight. By varying the ratio D/d along the length of center conductor 206 one can compensate for changes in impedance caused by, inter alia, the dielectric constants of the insulating ends 204. The portion of gas discharge tube 200 that is used for impedance matching is designated by the letter "I", to distinguish it from the active discharge region "G".

In addition to adjusting the ratio D/d within the gas discharge tube, it is also possible to adjust the length of the active gas discharge region "G" relative to the length of the impedance matching region "I" to match the impedance of the gas discharge tube to that of the coaxial transmission line. Thus, for a 50 ohm coaxial transmission line the ratio of the region "G" to the region "I" may be on the order of one to one whereas, for a 75 ohm coaxial transmission line, the ration of the region "G" to the region "I" may be on the order of one to two.

Figure 7:
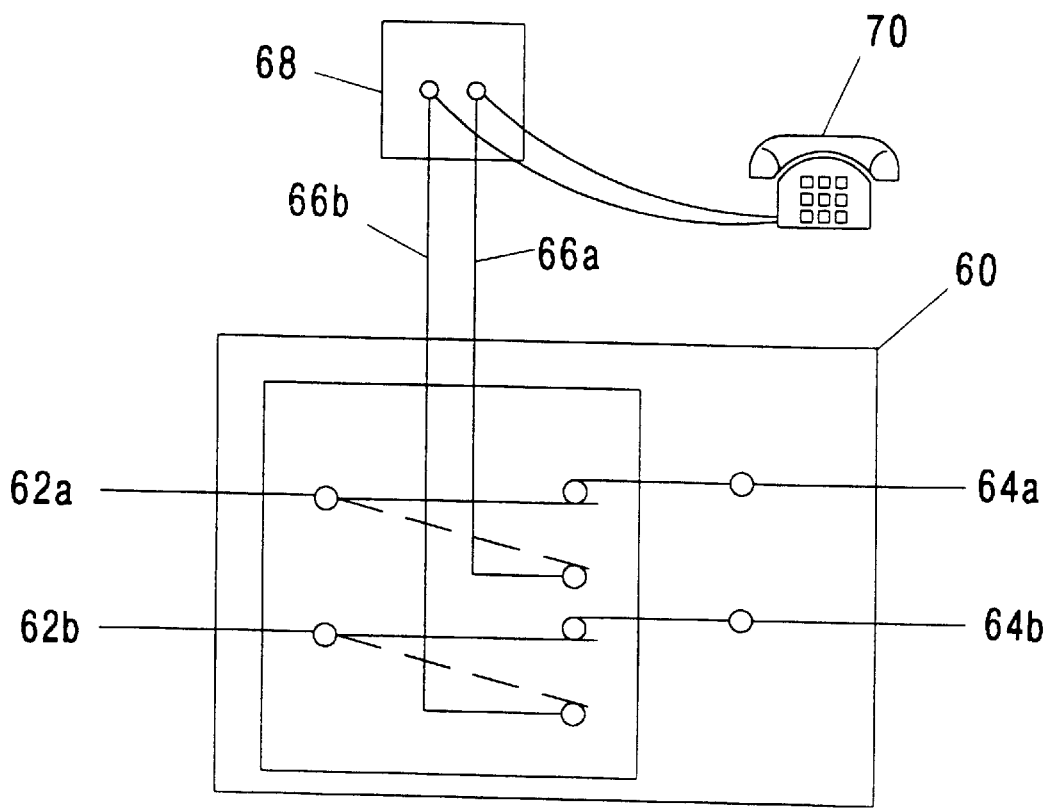
FIG. 7 is a schematic diagram of a switchable electrical socket for use in a subscriber bridge module.

As shown schematically in FIG. 7, the removable subscriber bridge module 20 preferably contains a plug-actuated switchable RJ-11 type socket 24 that may be connected to a test phone 70. Under normal operation (with no plug in the switchable socket the telco wires 62a, 62b are connected to the subscriber wires 64a, 64b. When a plug is inserted in the socket, the telco wires are disconnected from the subscriber wires and are connected to wires 66a, 66b which are then connected to test phone 70. This arrangement provides a point of demarcation between the telco and subscriber lines.

Figure 8:
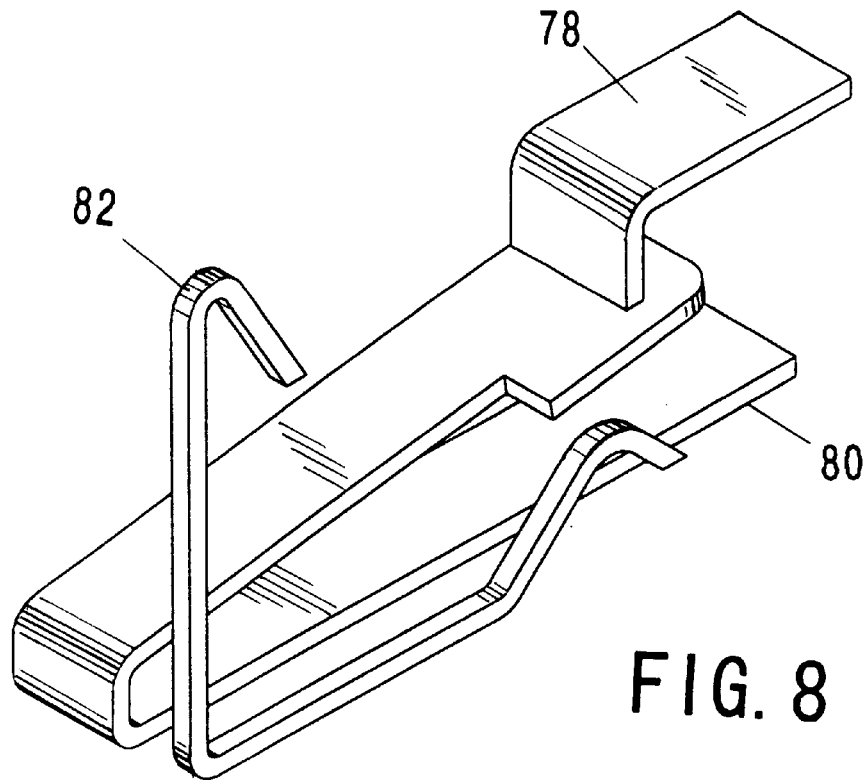
FIG. 8 is a perspective view of one set of electrical contacts for use in the switchable electrical socket shown schematically in FIG. 7, the contacts being shown in their normal position.
Figure 9:
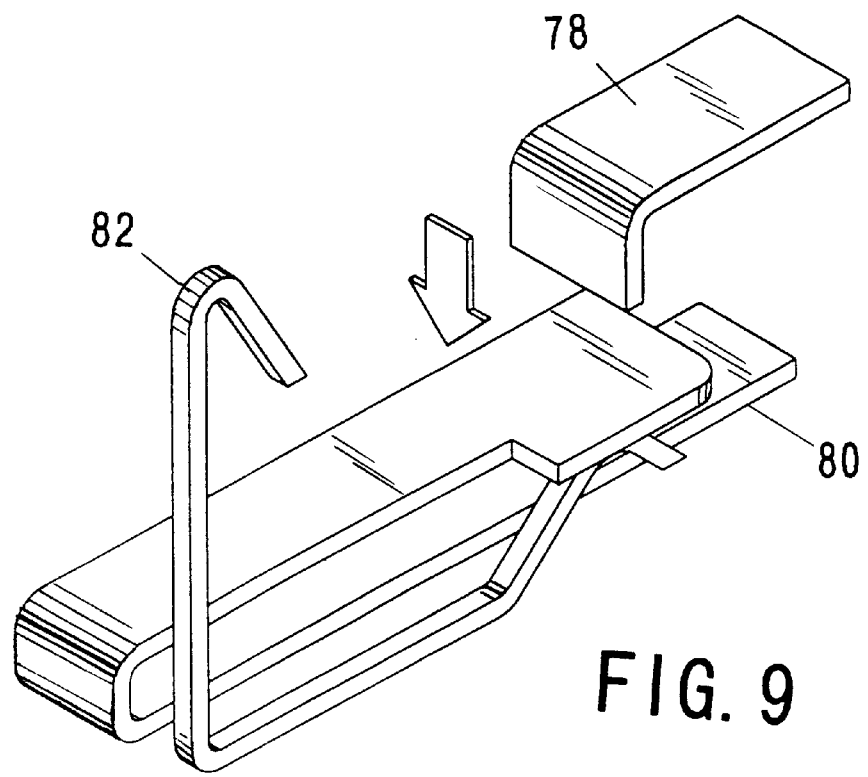
FIG. 9 is a perspective view of the same set of electrical contacts shown in FIG. 8 but the contacts being shown in their test position.

FIGS. 8 and 9 are reproduced from FIGS. 17 and 18 of the TII '136 patent. As shown in FIGS. 8 and 9, the plug actuated switchable socket 60 has a customer contact 78 for connection to the subscriber wires, a telco contact 80 for connection to the telco wires and a test contact 82 for connection to a plug. The test contact 82 does not lie in the same plane as the customer and telco contacts 78 and 80. Note that the customer contact 78 and the telco contact 80 are of a heavier gauge material (and therefore have a greater current carrying capacity) than test contact 82. This increases the reliability of the switchable socket as a mechanism for connecting the telco and subscriber lines.

FIGS. 8 and 9 also show the interaction of the customer, telco and test contacts. As would be understood by a person of ordinary skill in the art, while FIGS. 8 and 9 only show one set of customer, telco and test contacts, switchable socket 60 actually has two sets of such contacts to accommodate the pair of telco and subscriber wires.

When the plug is not plugged into switchable socket 60, the telco contact 80, and thus the telco wires, are connected to the customer contact 78, and thus the subscriber wires, and the test contact 82 is out of the circuit. When the plug is inserted in socket 60, the customer contact 78, and thus the subscriber wires, are disconnected from the telco contact 80, and thus the telco wires, and the telco contact and telco wires are connected to the test contact 82 in socket 60 which mate with contacts in the RJ-11 test plug. See also FIGS. 14–16 of the TII '136 patent which show the mechanical interaction between the test plug and the switchable socket. FIGS. 14–16 are incorporated herein by reference.

While the present invention has been described by reference to various preferred embodiments, it will be understood by persons skilled in the art that many modifications may be made in those preferred embodiments without departing from the spirit and scope of the present invention. Accordingly, it is intended that the invention not be limited to the disclosed preferred embodiments, but that it have the full scope permitted by the following claims.

What is claimed is:

1. Cable interconnection apparatus for interconnecting coaxial cables or fiber optic cables, the apparatus being adapted to be removably mounted in the base of a network interface device, the apparatus comprising:

(a) a structure having a generally horizontal base portion, a generally vertical middle portion and a generally horizontal top portion;

(b) the base portion of the structure having two ends, one end being adapted to fit under an inverted L-shaped member extending upwardly from the base of the network interface device and the other end having a downwardly projecting portion being adapted to fit into a recess in the base of the network interface device;

(c) the middle portion of the structure having an aperture therein;

(d) the top portion of the structure having a notch adapted to receive an outwardly extending tab on a flexible member extending upwardly from the base of the network interface device; and (e) a connector mounted in the aperture of the structure for connecting the cables.

2. The apparatus of claim 1 wherein the structure is metallic.

3. The apparatus of claim 2 wherein the structure comprises two pieces of metal, a generally flat first member and a generally Z-shaped second member, the first and second members being spot welded together.

4. The apparatus of any of claims 1, 2 or 3 wherein the connector is a fiber optic connector for connecting fiber optic cables.

5. The apparatus of claim 4 wherein the fiber optic connector is an SC-type connector.

6. The apparatus of any of claims 1, 2 or 3 wherein the connector is a coaxial connector for connecting coaxial cables.

7. The apparatus of claim 6 wherein the coaxial connector is a bulkhead-type coaxial connector.

8. The apparatus of claim 6 wherein the coaxial connector includes a coaxial surge arrestor.

9. The apparatus of claim 8 wherein the coaxial surge arrestor comprises:
   (a) a hollow conductive housing;
   (b) insulating ends adapted to seal the housing;
   (c) an inert gas sealed in the housing;
   (d) a conductor extending through the housing, the conductor having a longitudinal axis oriented in a direction parallel to the direction of signal transmission; and
   (e) the diameter of the conductor being varied along at least a portion of the length of the conductor within the housing for matching the impedance of the surge arrestor to that of the coaxial cables.

10. A network interface device comprising:
    (a) an enclosure having a base and a cover;
    (b) at least one cable interconnection apparatus removably mounted in the base of the enclosure for connecting coaxial cables or fiber optic cables, the apparatus comprising a structure having a generally horizontal base portion, a generally vertical middle portion and a generally horizontal top portion;
    (c) the base portion of the structure having two ends, one end being adapted to fit under an inverted L-shaped member extending upwardly from the base of the enclosure and the other end having a downwardly projecting portion being adapted to fit into a recess in the base of the enclosure;
    (d) the middle portion of the structure having an aperture therein;
    (e) the top portion of the structure having a notch adapted to receive an outwardly extending tab on a flexible member extending upwardly from the base of the enclosure;
    (f) a connector mounted in the aperture of the structure for connecting the cables; and
    (g) at least one subscriber bridge module removably mounted in the base of the enclosure for interconnecting telephone company and subscriber lines.

11. The network interface device of claim 10 further including at least one overvoltage protection device mounted in the base of the enclosure for protecting the telephone company lines from overvoltage conditions.

12. The network interface device of claim 10 wherein the structure is metallic.

13. The network interface device of claim 12 wherein the structure comprises two pieces of metal, a generally flat first member and a generally Z-shaped second member, the first and second members being spot welded together.

14. The network interface device of claim 10 wherein the subscriber bridge module comprises a socket having an electrical switch, the switch having two sets of first, second and third contacts, the first contacts of both sets for being connected to the telephone company line, the second contacts of both sets for being connected to the subscriber line, the first and second contacts of each set being normally connected in the absence of a plug in the socket, thereby connecting the telephone company and subscriber lines, the first contacts of both sets being disconnected from the second contacts of both sets and being connected to the third contacts of both sets when a plug is inserted in the socket, thereby disconnecting the telephone company line from the subscriber line and connecting the telephone company line to the third contacts of both sets which in turn connect with contacts in the plug and provide a demarcation point between the telephone company and subscriber lines.

15. The network interface device of claim 14 wherein the current carrying capacity of the first and second contacts of both sets is greater than the current carrying capacity of the third contacts of both sets.

16. The network interface device of any of claims 10 through 15 wherein the connector is a fiber optic connector for connecting fiber optic cables.

17. The network interface device of any of claims 10 through 15 wherein the connector is a coaxial connector for connecting coaxial cables.

18. The network interface device of claim 17 wherein the coaxial connector includes a coaxial surge arrestor.

19. The network interface device of claim 17 wherein the coaxial surge arrestor comprises:
    (a) a hollow conductive housing;
    (b) insulating ends adapted to seal the housing;
    (c) an inert gas sealed in the housing;
    (d) a conductor extending through the housing, the conductor having a longitudinal axis oriented in a direction parallel to the direction of signal transmission; and
    (e) the diameter of the conductor being varied along at least a portion of the length of the conductor within the housing for matching the impedance of the surge arrestor to that of the coaxial cables.

* * * * *